INVENTOR.
Walter H. Coles
BY
Marechal & Biebel
ATTORNEYS

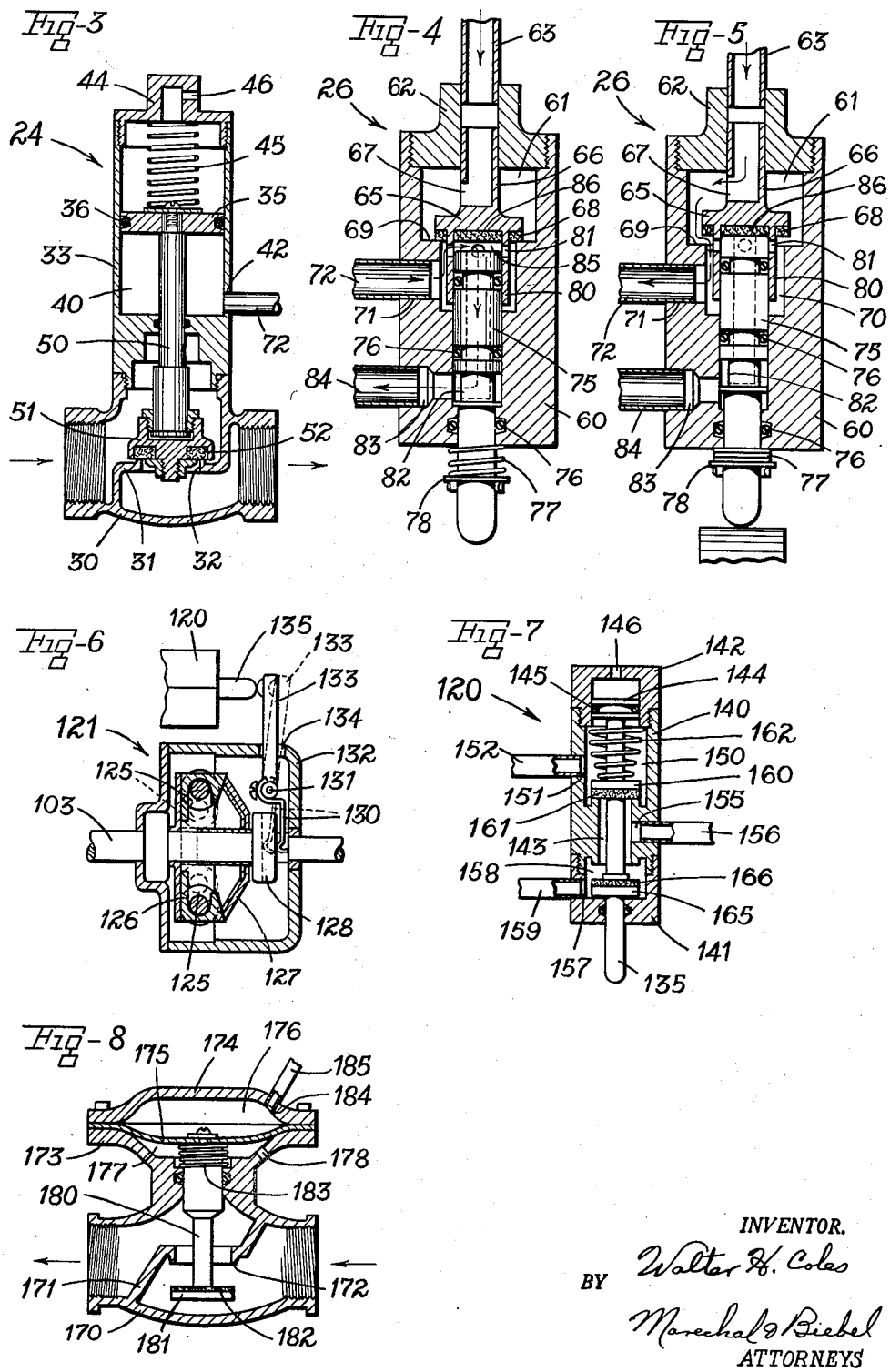

UNITED STATES PATENT OFFICE 2,625,428

SPRINKLING SYSTEM

Walter H. Coles, Troy, Ohio, assignor to The Skinner Irrigation Company, Troy, Ohio, a corporation of Ohio Application May 19, 1949, Serial No. 94,197

5 Claims. (Cl. 299—27)

This invention relates to sprinkling or irrigation systems. The invention relates particularly to a sprinkling or irrigation system adapted for installation adjacent a residence or on an estate where it is desirable to provide for selectively irrigating different parts of the lawn or grounds in definite steps or sequence. It is advantageous in such case to have a feeder line which is supplied from a main water supply under the control of a main shutoff valve, such shutoff valve providing for stopping the flow of water to the entire system when closed. A number of distributing valves are connected to the feeder line at different points where they can be most conveniently located for the supply of the individual outlet or outlets, such as the separate sprinklers located in different areas around the property. These outlets are arranged in groups comprising one or more individual sprinklers or nozzles, and are suitably arranged to cover the different areas or locations requiring sprinkling.

Control of the distributing valves is secured by means of a series of pilot valves, one being provided for each distributing valve, the pilot valves being conveniently located at a central point where they are operated by a suitable mechanical control mechanism driven by an electric motor for example. The pilot valves are in turn connected with their corresponding distributing valves through pressure lines, the system being so arranged that these connecting lines merely apply or withdraw fluid pressure with respect to the distributing valve operating mechanism, thus making it possible to utilize lines which are small and easily and economically installed, as well as avoiding the continuance of flow of even a pilot source of liquid, so that the system is also highly economical in operation. With this arrangement the main distributing valves which control the flow may be located wherever desired, in positions remote from the central control point, thus avoiding the running to a central control point of the large size and correspondingly expensive piping for carrying the main flow of water.

The drive mechanism operates the pilot valves in predetermined sequence so that each of them will effect the opening of its associated distributing valve for a definite period of time, the operations being so related that only one distributing valve is open at a time, and thereby assuring the development of full line pressure for the particular group of nozzles being operated. The control thus continues cyclically through each of the pilot valves and its associated distributing valve in sequence, the over-all time being conveniently controlled by a clockwork or other timing device.

It is also desirable to provide for the stoppage of the main flow in the event of any interruption in the drive for the sequential operation of the pilot valves, such as might occur for example from failure of the power supply for the drive motor which operates such mechanism. Such stoppage might permit the water to flow continuously through one group of outlets and produce excessive irrigation in such one area. To avoid this possibility, the main shutoff valve is correlated in its operation with the drive mechanism in such manner that pilot operating pressure for causing the opening of the shutoff valve is supplied under control of a centrifugal device so that the shutoff valve remains open as long as the drive mechanism is in operation, but when its operation stops, the centrifugal device then interrupts the supply of pilot pressure, and the main shutoff valve closes, thereby shutting off the entire system and preventing waste of water.

It is accordingly one of the principal objects of the present invention to provide an automatic sprinkling or irrigation system of this character which is simple to manufacture and install in a desired arrangement to suit the layout of the area to be watered, economical to operate at a desired rate or frequency, and easy to maintain.

Another object is to provide such a system wherein the distributing valves are hydraulically opened by line pressure supplied thereto by pilot valves which require only relatively small pressure control lines so that they can be conveniently located together at a central point and connected to their respective distributing valves which control the main flow and are located at remote points along the main supply line.

An additional object is to minimize waste of water in such a system by providing separate pilot valves for the several pressure operated distributing valves which operate without at any time producing a continuing flow from the supply line.

It is also an object of the invention to provide such a system in which the pilot valves are mechanically operated in sequence and to assure that complete shutoff of the water supply to the system will occur in the event of failure of the mechanical drive regardless of the point in the cycle at which such stoppage occurs.

Other objects and advantages of the invention will be apparent from the following description, the accompanying drawings and the appended claims.

In the drawings—

Fig. 3 is a detail view in section showing one of the hydraulic distributing valves of the system;

Fig. 4 is a sectional view through one of the pilot valves of the system, showing the valve in closed position wherein it effects closing of its associated hydraulic valve;

Fig. 5 is a view similar to Fig. 4 showing the pilot valve in open position;

Fig. 6 is a somewhat diagrammatic detail view showing a centrifugal device for controlling the pilot valve for the shutoff valve in the system of Figs. 1 and 2;

Fig. 7 is a view similar to Fig. 4 showing a form of pilot valve suitable for use with the shutoff valve; and Fig. 8 is a detail view in section showing another form of hydraulic valve.

Figure 1:
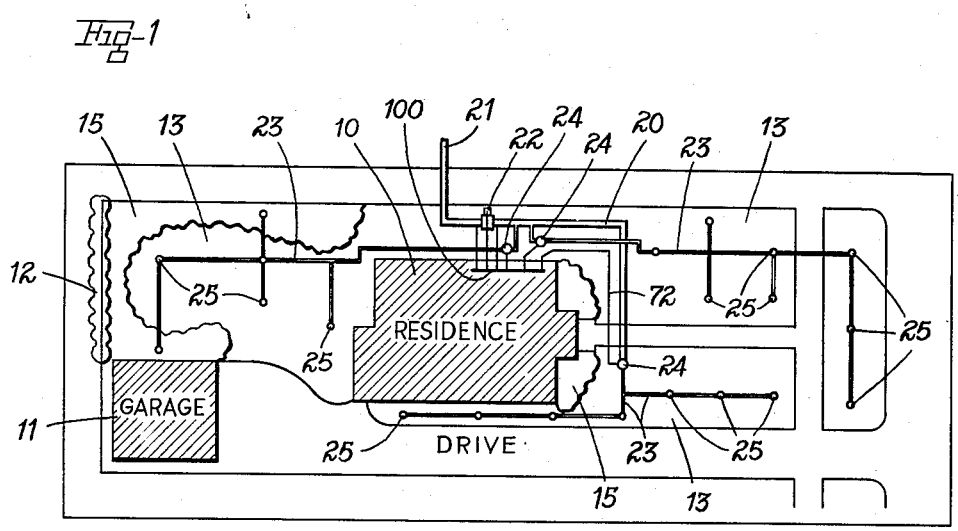
Fig. 1 is a diagrammatic view of an automatic sprinkling system in accordance with the invention for a residence property.
Figure 2:
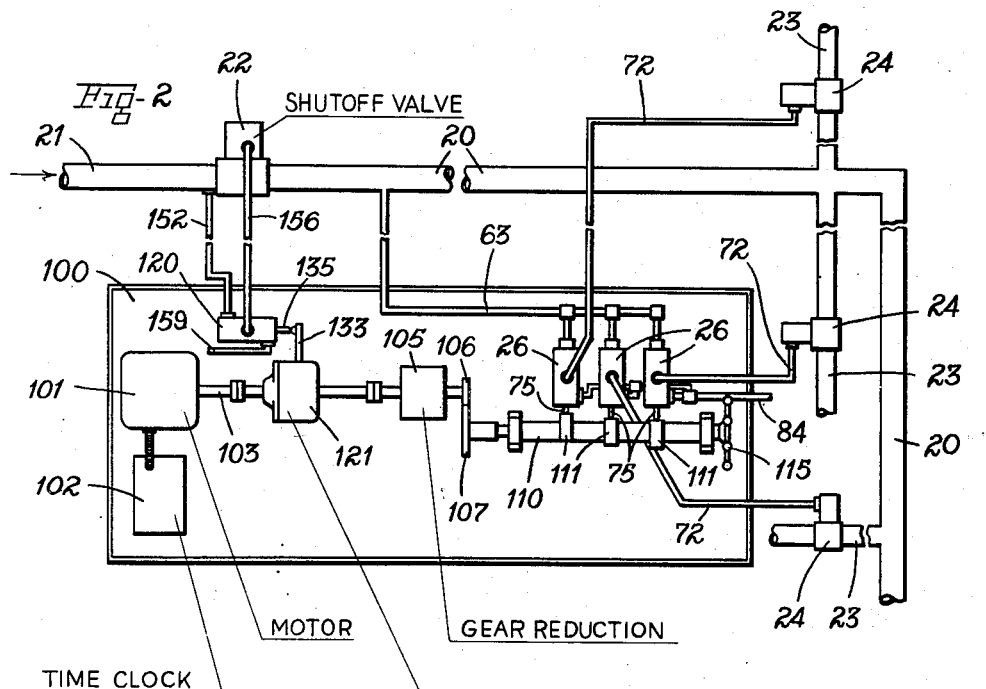
Fig. 2 is a diagrammatic view of the control panel and pipe connections of the system shown in Fig. 1.

Referring to the drawings, which illustrate preferred embodiments of the present invention, Figs. 1 and 2 show somewhat schematically an arrangement of automatic sprinkling system for irrigating a lot containing a house 10 and garage 11 and including shrubbery 12, lawns 13 and plant beds 15. The main feeder line 20 for water is connected with a main supply line 21 through a pressure operated shutoff valve 22, and a plurality of branch lines 23 lead from line 20 on the downstream side of valve 22, each of these branch lines being provided with a pressure operated distributing valve 24. Each branch line 23 leads beyond the valve 24 therein to one or more sprinkling outlets or nozzles indicated diagrammatically at 25, and it will be noted that the lines 23 and nozzles 25 are arranged and located on the lot to provide for irrigating substantially the entire area of the lawns and plant beds.

The operation of each group of sprinklers 25 is controlled individually by its associated distributing valve 24, and these valves in turn are of such construction as to open when pilot pressure is supplied thereto from their associated pilot valves 26 and to close when the pilot pressure is relieved, a suitable construction for these valves 24 being shown in detail in Fig. 3. As shown, the valve includes a T-shaped valve body 30 adapted for direct connection in the branch line 23 and having an internal partition 31 which includes an annular valve seat 32. A casing 33 is mounted on valve body 30, and a piston 35 having a sealing ring 36 is mounted for reciprocating movement in this casing and forms in the interior thereof a pressure chamber 40 having a port 42. The outer end of casing 33 is closed by a cap 44, and a coil spring 45 is arranged between piston 35 and cap 44 in position to urge the piston in opposition to the pressure within chamber 40, cap 44 being provided with a vent 46.

A reciprocable rod 50 extends through the lower part of casing 33 into the interior of valve body 30 and is secured at its upper end to piston 35. A piston 51 is secured to the lower end of rod 50 and carries a valve disk 52 adapted to engage the seat 32 to close the valve. The spring 45 thus normally urges piston 35 downwardly to carry the valve disk 52 into valve closing position, and in this position of the parts with the water entering at the left in Fig. 3 as indicated by the arrow, the line pressure in the portion of valve body 30 above piston 51 tends to hold the piston and disk 52 in seated position. However, since piston 35 is of greater area than piston 51, when line pressure is supplied to the pressure chamber 40 to port 42, piston 35 will be moved against spring 45 to open the valve.

As already noted, operating pressure for each of the distributing valves 24 is controlled by its associated pilot valve 26, and the construction and operation of one of these pilot valves are shown in detail in Figs. 4 and 5. The valve body 60 encloses a chamber 61 which is closed by a cap 62 connected to the feeder line 20. Thus as shown in Fig. 2, the three pilot valves 26 are each connected to a common line 63 from the feeder line. A plunger 65 includes a hollow stem portion 66 slidably guided in cap 62 and having a port 67 in the side thereof. This plunger carries a washer 68 which seats on the annular shoulder 69 surrounding the upper end of the bore 70 in valve body 60. A port 71 connects with the bore 70, and a line 72 leads from this port 71 to the port 42 of the pressure chamber 40 in one of the distributing valves 24.

A piston 75 is mounted for reciprocating movement in the lower part of valve body 60, and sealing rings 76 are provided for preventing the passage of water between the outer surface of this piston and the surrounding bore wall in the valve body. The piston 75 extends outwardly of the body 60, and a coil spring 77 is arranged between the valve body and a collar 78 on the piston to urge the piston normally to its position of maximum movement outwardly of the valve body. The inner end of piston 75 has sliding engagement within a downwardly extending sleeve portion 80 of plunger 65 which has ports 81 near the upper end thereof and is of sufficiently smaller diameter than bore 70 to leave a considerable annular space therein. The upper portion of piston 75 is hollow from its upper end down to a port 82 in the side of the piston, and when the piston is in its normal position shown in Fig. 4, the port 82 connects with a port 83 in the valve body which is provided with a connection 84 to drain.

Fig. 4 shows the pilot valve 26 in its closed position wherein its associated distributing valve is also closed. The plunger 65 is seated on the shoulder 69 to close the connection from the supply line, the line pressure being effective to hold plunger 65 in closed position. The piston 75 is in its limit position of outward movement from the valve body, and it will be noted that this leaves a space 85 between the upper end of the piston and the packing 86 at the inner end of sleeve 80. Accordingly, there is an open connection from the port 71 through the bore 70 and the passages 81 into this space 85 and thence through the hollow portion of the piston and the port 82 to the drain port 83.

Fig. 5 shows the pilot valve in its open position for effecting opening of its associated distributing valve. The piston 75 has been moved against spring 77 to its limit position of upward movement in which its upper end contacts the packing 86 and then lifts plunger 65 away from the shoulder 69. This establishes a through flow from the supply line through the plunger stem 66 and port 67 to the chamber 61, and then around the lower end of the plunger through the bore 70 to the port 71. At the same time, since the upper end of the piston is seated against packing 86, the interior of the piston is sealed and the drain connection is thus closed.

It will accordingly be seen that when the piston 75 moves from its position shown in Fig. 4 to its position shown in Fig. 5, the first step in its movement will be for its open upper end to seat against the packing 86 and thus to close the connection from port 71 to the drain port 83. Then as the piston continues to move upwardly, it unseats the plunger 65 and thereby establishes the desired direct connection from the supply line to the pressure chamber of the associated distributing valve, thus effecting opening of the distributing valve as described in connection with Fig. 3. On the return movement of piston 75 from its position shown in Fig. 5 to its position shown in Fig. 4, the first step will be to return the plunger 65 to its seated position on shoulder 69 and thus to close the connection from the supply line. During the remaining movement of the piston, its upper end moves away from the packing 86, thus uncovering ports 81 and establishing a connection from port 71 through the interior of the piston to the drain port. When this occurs, the water in the pressure chamber 40 of the distributing valve can escape to drain, and with the pressure in chamber 40 thus relieved, the spring 45 will cause the distributing valve to close.

Fig. 2 shows a drive arrangement for operating the pilot valves 26 in succession in order to cause each of the distributing valves 24 to be opened in succession for timed intervals. As shown, the three pilot valves 26 are mounted adjacent each other on a panel or board 100 which also carries an electric motor 101 and a time clock 102 for starting and stopping the motor at desired intervals. The motor shaft 103 is provided with a gear reduction 105, and a pair of gears 106 and 107 transmits the drive from the gear reduction to a cam shaft 110. This gear reduction system is preferably selected to provide for rotation of the cam shaft at a slow speed, for example a speed of the order of one rotation per hour.

The cam shaft 110 carries a plurality of cams 111, one for each of the distributing valves, and these cams are set in angularly spaced relation so that each engages the piston 75 of its associated valve 26 at a different time in order to cause successive operation of the valves 26 as the cam shaft rotates. The angular extent of each cam 111 is preferably such that each pilot valve will be open for the same length of time as the other during a complete revolution of shaft 110. With this arrangement, the time clock 102 can be set to cause motor 101 to operate at desired intervals, and while the motor is operating, the valves 26 will be operated in succession to effect opening of the distributing valves 24 in rotation for operation of their groups of associated nozzles. A hand wheel 115 is also mounted on cam shaft 110 to provide for manual operation of the cam shaft when desired.

The shutoff valve 22 which controls the flow through feeder line 20 is provided with operating means responsive to operation of motor 101. This valve 22 is shown as hydraulically operated similarly to the distributing valves 24, and it is connected in the feeder line ahead of the line 63 to the three pilot valves 26. The shutoff valve 22 is provided with a pilot valve 120 which is in turn operated by a centrifugal device 121 mounted on the motor shaft 103, the arrangement being such that when the motor shaft is rotating, the centrifugal device will cause pilot valve 120 to effect opening of the shutoff valve, and conversely when the motor shaft stops, the pilot valve will cause the shutoff valve to close.

Fig. 6 shows a centrifugal device 121 suitable for operating the pilot valve 120. It includes a pair of weights 125 supported for radial movement in a carrier 126 mounted on shaft 103. The weights 125 are shown as rollers which are adapted to engage the inner surface of a cone 127 mounted for sliding movement on shaft 103 and having a collar 128 at its outer end. The collar 128 engages a yoke 130 secured to a shaft 131 mounted in the casing 132 of the device and carrying a lever arm 133 which extends outwardly through a slot 134 in the casing wall and is adapted to engage the projecting piston portion 135 of pilot valve 120. It will be seen that when the shaft 103 is at rest, the return spring in the pilot valve acting against piston 135 will move lever arm 133 to the right as viewed in Fig. 6, as indicated in dotted lines, and when the shaft 103 is rotating, outward movement of the weights 125 will force sleeve 127 and collar 128 to the right in Fig. 6, thus forcing yoke 130 in a similar direction and causing the lever arm 132 to pivot and move piston 135 against its return spring as shown in full lines in Fig. 6.

The pilot valve 120 may be of the same construction shown in Figs. 4 and 5, but since its movement between open and closed positions is normally rapid, a simpler construction of pilot valve may be used as shown in Fig. 7. The valve body 140 is provided with caps 141 and 142 at either end thereof, and it has a central bore 143. The piston 135 is slidably guided in the cap 141 and by a piston 144 slidable in the cap 142 and provided with a sealing ring 145, the cap 142 being vented at 146. The chamber 150 in the valve body has a port 151 which is connected with the supply line as indicated at 152 in Fig. 2. A second port 155 opens into the bore 143 and is connected with the pressure chamber of shutoff valve 22 by a line 156 (Fig. 2), and a port 157 in cap 141 connects the chamber 158 at the lower end of the valve body to drain line 159.

The piston 135 carries a valve member 160 provided with a sealing disk 161 adapted to close the upper end of bore 143, and a spring 162 is mounted in chamber 150 to urge the piston normally in a direction to cause seating of this valve member. A similar valve member 165 is carried by piston 135 in chamber 158 and is provided with a sealing disk 166 adapted to close the lower end of bore 143 when the piston is moved against spring 162. Thus when the valve parts are in the positions shown in Fig. 7, the valve member 160 closes the connection from the supply line, and there is a connection between the port 155 and the drain port 157 through the bore 143 and chamber 158. When the piston moves to its upper limit position, the valve member 165 seals the lower end of bore 143 to close the drain port, and at the same time the valve member 160 moves upwardly to establish a connection from the supply line port 151 through the bore 143 to port 155 and the pressure chamber of the shutoff valve.

It will accordingly be seen that with this arrangement as described and shown in Fig. 2, when the motor 101 is in operation, the centrifugal device 121 will move the valve piston 135 inwardly of the valve body to admit line pressure to the pressure chamber of the shutoff valve 22 and thus to cause this valve to open and admit water to the pilot valves 26 and the distributing valves 24. However, when the motor stops, the spring 162 will return piston 135 to its position in Fig. 7, and when this occurs, the pressure in the pressure chamber of the shutoff valve will be relieved so that this valve can close and thus discontinue the supply of water to the distributing valves 24 and the pilot valves 26. Accordingly, if the motor should fail for any reason while one of the groups of sprinkling nozzles is in operation, the supply of water to the distributing valves will be cut off and undesired use of water will thus be avoided.

Fig. 8 shows a different construction of hydraulically operated valve which may be employed in place of the valve shown in Fig. 3 as either the shutoff valve 22 or one or more of the distributing valves 24. The valve body 170 is constructed for connection in a pipe line and includes an internal partition 171 in which is formed the annular valve seat 172. The upper part of the valve body includes a flange 173, and a domed cap 174 is bolted to this flange. A flexible diaphragm 175 is secured between the cap 174 and flange 173 and cooperates with the cap and valve body to form a pressure chamber 176 and a second chamber 177 having a vent 178 to atmosphere.

A piston 180 is bolted to the diaphragm 176, and its lower end carries a valve disk 181 having a washer 182 which is adapted to engage the seat 172 to close the valve. A coil spring 183 normally urges diaphragm 175 upwardly to carry piston 180 to a position wherein the valve disk 181 is seated to close the valve. The pressure chamber 176 has a port 184 from which a line 185 leads to a pilot valve, such as one of the valves shown in Figs. 4, 5 and 7, to admit line pressure to the chamber 176 and thus to move the diaphragm and piston downwardly and cause the valve to open. It will also be noted that with the valve body 170 connected in the line with the direction of flow as indicated by the arrows in Fig. 8, the line pressure will act to close the valve and to hold the valve disk 181 in seated position when the pressure in chamber 176 is relieved.

It will accordingly be seen that the present invention provides a simple and effective automatic sprinkling system which has substantial advantages from the standpoint of easy installation and operating efficiency. The distributing valves and shutoff valve can be located wherever convenient along the supply line and feeder line system, while the pilot valves may be grouped for convenient operation on the control board. The connections to and from the pilot valves do not require pipes of the same capacity as the feeder lines, satisfactory results being obtained using copper tubing or like material for these connections, thus promoting simple and economical installation. It will also be noted that in this system there are no bleed holes or similar small apertures which might be clogged in operation, all of the ports and lines in and to the different valves being of substantial size such that clogging is highly unlikely.

Another advantage of this system is that the water consumed for operation of each distributing valve is at most the amount contained in the pressure chamber of the valve and the line connecting this chamber to the pilot valve, this being the water which is released to drain when the valve is open. The requirements with respect to electrical apparatus and electric current are also relatively low, the time clock 102 being of simple construction which has only to start and stop the motor as required, and the only current needed during operation of the system being that for the motor itself. The invention also provides insurance against waste of water in the event of accidental failure of the drive motor, the shutoff valve being automatically responsive to stopping of the motor and all of the hydraulic valves being so arranged that when closed, the line pressure acts to hold the valve closing members in closed position.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a sprinkling system of the character described including a plurality of groups of sprinkling nozzles and a supply line for said nozzles, the combination of separate distributing valves for selectively controlling the flow of water to said groups of nozzles from said supply line, each said distributing valve having a pressure chamber, means for opening each said distributing valve when pressure is supplied to said chamber and for closing said valve when said pressure is relieved, a plurality of pilot valves each connected to said supply line and to the pressure chambers of different ones of said distributing valves, means in each said pilot valve for supplying line pressure to the respective said pressure chamber when said pilot valve is open for opening the associated said distributing valve and for connecting said pressure chamber thereof to drain to effect closing of said distributing valve when said pilot valve is closed, and means for selectively operating said pilot valves to effect selective control of said distributing valves for operation of each said group of nozzles.

2. In a sprinkling system of the character described including a plurality of sprinkling nozzles and a supply line for said nozzles, the combination of separate distributing valves for selectively controlling the supply of water to said nozzles from said supply line, means for opening each of said distributing valves and said nozzles is supplied thereto and for closing said valve when said pressure is relieved, a plurality of mechanically operable pilot valves each connected to said supply line and to a different one of said distributing valves, each said pilot valve having a connection to drain and being adapted when open to supply pilot pressure to said distributing valve and when closed to relieve said pilot pressure and effect closing of said distributing valve, and drive means for operating said pilot valves in succession to cause successive operation of each of said distributing valves and said nozzles.

3. In a sprinkling system of the character described including a plurality of sprinkling outlets and a supply line for said outlets, the combination of separate distributing valves for selectively controlling the flow of water to said nozzles from said supply line, each said distributing valve including a pressure chamber and being adapted to open when line pressure is supplied to said pressure chamber and to close when said pressure is relieved, a plurality of pilot valves each having a connection to drain and also having connections to said supply line and to said pressure chamber of different ones of said distributing valves, each said pilot valve including control means movable between a first position closing said supply line connection and connecting said pressure chamber to drain and a second position closing said drain connection and connecting said supply line to said pressure chamber, said control means including means for closing said drain connection before opening said supply line connection when moving from said first position to said second position and for closing said supply line connection before opening said drain connection when moving from said second position to said first position, and means for operating said pilot valves.

4. In a sprinkling system of the character described including a plurality of sprinkling nozzles and a supply line for said nozzles, the combination of separate distributing valves for selectively controlling the supply of water to said nozzles from said supply line, means for opening each said distributing valve when pilot pressure is supplied thereto and for closing said valve when said pressure is relieved, a plurality of mechanically operable pilot valves each connected to said supply line and to different ones of said distributing valves, means forming a common connection to drain from each of said pilot valves, each said pilot valve being adapted when open to supply pilot pressure to said distributing valve to open the same and when closed to relieve said pilot pressure and effect closing of said distributing valve, and means for selectively operating said pilot valves to cause selective operation of each of said distributing valves and said nozzles.

5. In a sprinkling system of the character described including a plurality of sprinkling outlets and a supply line for said outlets, the combination of separate hydraulically operated distributing valves for selectively connecting said outlets to said supply line, a plurality of pilot valves each connected with one of said distributing valves for controlling the hydraulic pressure therein to effect opening and closing of said distributing valve, mechanical means including a motor for selectively operating said pilot valves to control the supply of water to said groups of nozzles, a hydraulically operated shutoff valve controlling the supply of water to said distributing valves and to said pilot valves, another pilot valve controlling the hydraulic pressure in said shutoff valve, and means responsive to the operation of said motor for operating said other pilot valve to effect opening of said shutoff valve when said motor is in operation and to effect closing of said shutoff valve when said motor is not in operation.

WALTER H. COLES.

REFERENCES CITED

The following references are of record in the file of this patent:

UNITED STATES PATENTS

| Number | Name | Date |
|---|---|---|
| 1,323,867 | Johnson | Dec. 2, 1919 |
| 1,535,495 | Rawson | Apr. 28, 1925 |
| 1,606,245 | Lang | Nov. 9, 1926 |
| 1,652,845 | Vennum | Dec. 13, 1927 |
| 1,971,382 | Petersen et al. | Aug. 28, 1934 |
| 2,085,916 | Marra | July 6, 1937 |
| 2,252,125 | Hauser | Aug. 12, 1941 |
| 2,341,041 | Hauser | Feb. 8, 1944 |